United States Patent
Betts et al.

[11] 3,738,497
[45] June 12, 1973

[54] SILENT DRIVE COAT HANGER RACK MECHANISM

[75] Inventors: Edward E. Betts, Costa Mesa; Stanley N. Kulczycki, Redondo Beach, both of Calif.

[73] Assignee: McDonnell Douglas Corporation, Santa Monica, Calif.

[22] Filed: June 1, 1971

[21] Appl. No.: 148,459

[52] U.S. Cl.................. 211/1.5, 211/87, 248/429
[51] Int. Cl. ........................................... A47f 3/08
[58] Field of Search ................. 211/87, 123, 1.5, 211/103; 248/429; 74/424.8 A

[56] References Cited
UNITED STATES PATENTS

| | | | |
|---|---|---|---|
| 2,155,583 | 4/1939 | Bonnar | 211/1.5 |
| 3,309,060 | 3/1967 | Villars | 74/424.8 A |
| 1,018,118 | 2/1912 | Lally | 298/19 |
| 2,288,822 | 7/1942 | McCarron | 211/1.5 X |
| 2,846,079 | 8/1958 | Leeper | 211/123 |
| 2,927,627 | 3/1960 | Lohr | 248/429 |

*Primary Examiner*—Nile C. Byers, Jr.
*Attorney*—Walter J. Jason, Donald L. Royer and Robert O. Richardson

[57] ABSTRACT

A coat hanger rack silently elevated above passenger seats to store coats overhead and to provide more passenger room. The elevating mechanism consists of a powered, threaded rod on which a threaded nut traverses as the rod rotates, moving the coat rack verically. The nut moves the hanger yoke. Lateral forces are kept from the screw by transmitting them from the yoke to slipper bearing against guides. The Teflon slippers movable along the guide preclude looseness, high bearing pressure and roller noise.

8 Claims, 7 Drawing Figures

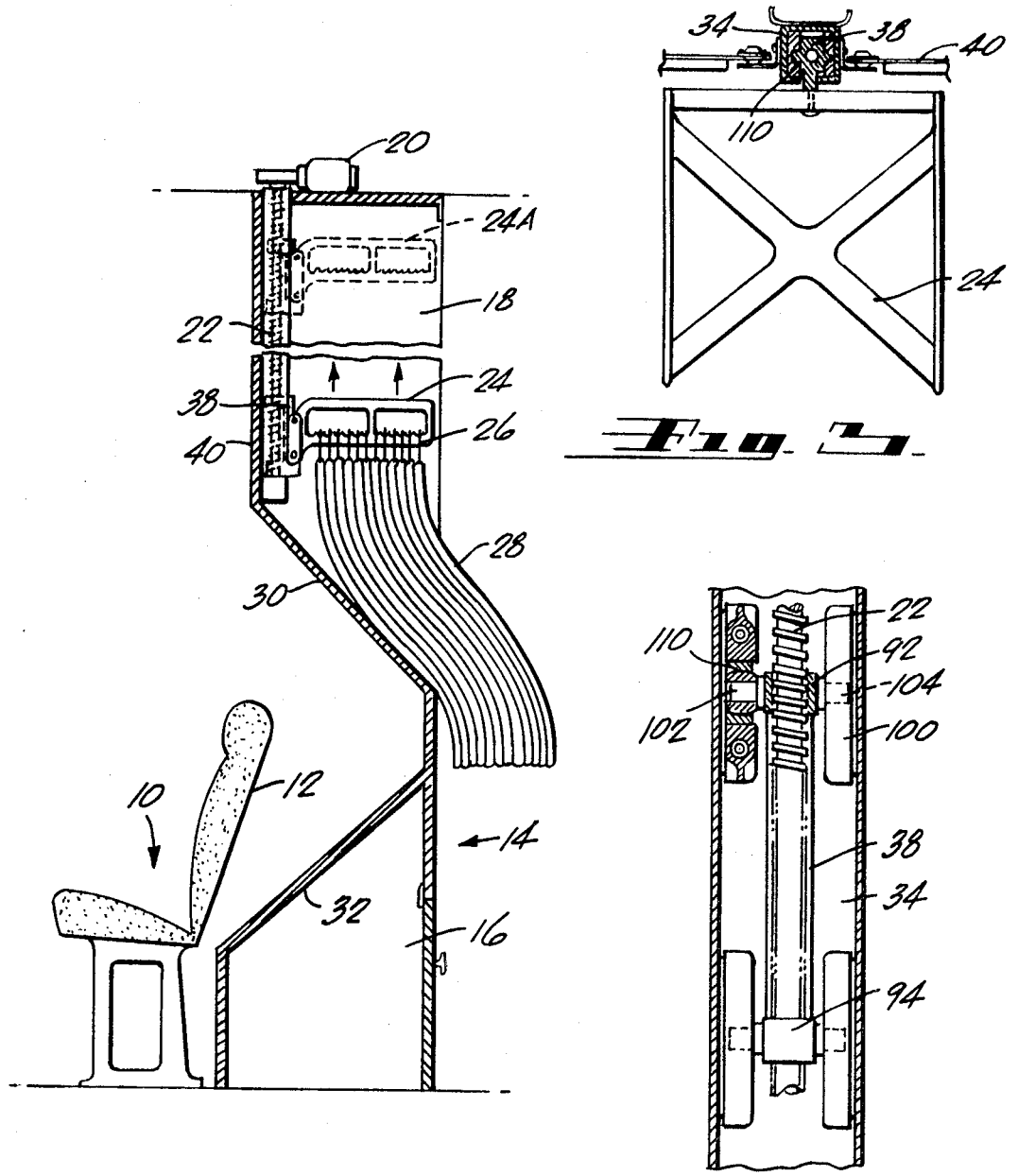

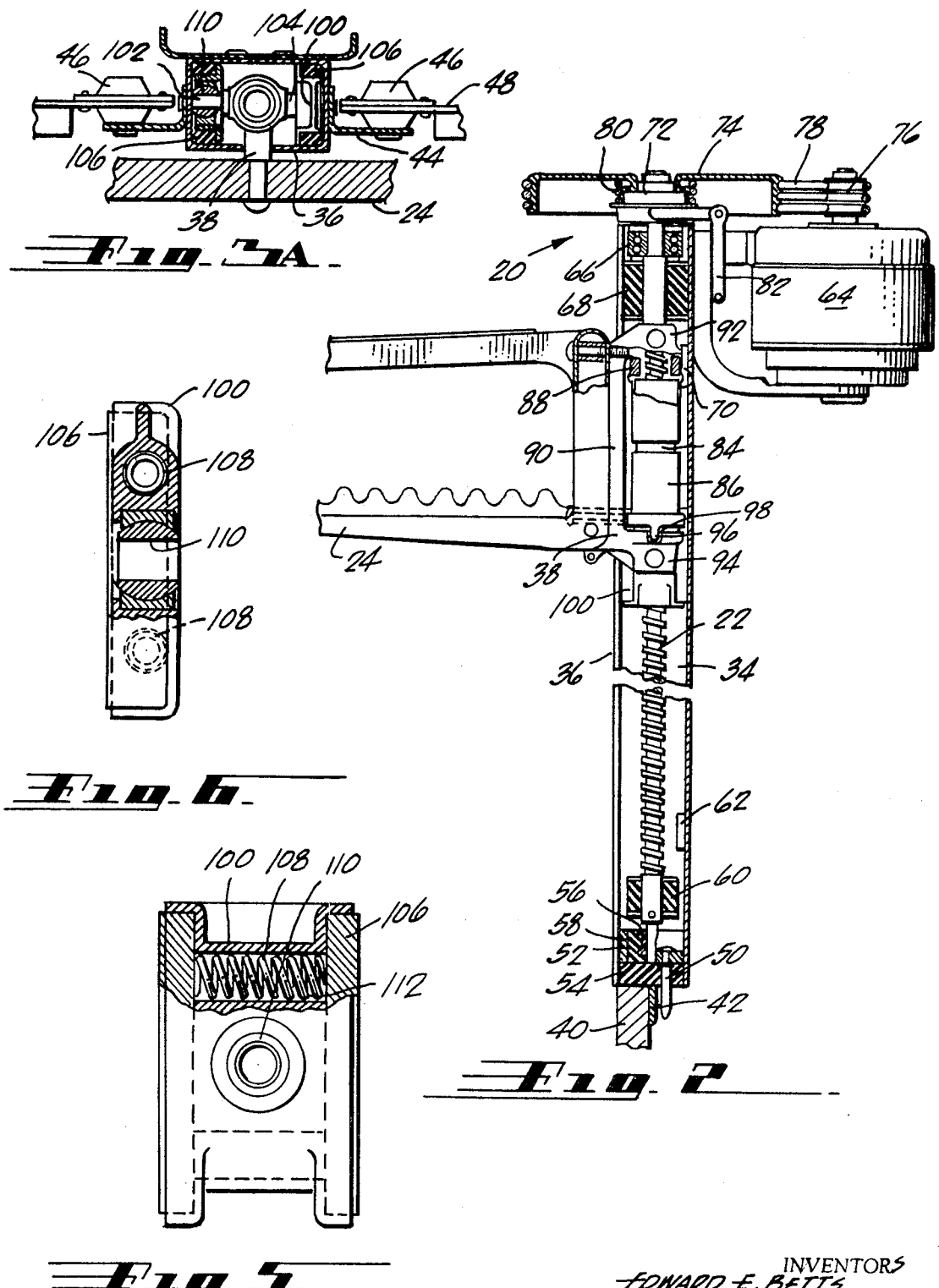

SILENT DRIVE COAT HANGER RACK MECHANISM

BACKGROUND OF THE INVENTION

There are a number of ways to elevate a coat rack so that it will be out of the way and provide more room for passengers in an aircraft or other vehicle. Cables or chains may be used, hydraulic cylinders or rack and pinion mechanisms may be employed for this purpose. If hydraulic cylinders are used, then hydraulic leaks can be a problem. Pneumatics require pressure which could be a hazard to safety. Space limitations, noise and maintenance prevents the use of chains, cables, steel tapes or rack and pinions. In a rack and gear combination, if the rack is not moved and the gear is made movable, in the movement of 160 pounds or approximately 48 passenger coats, the lift would be too big and a large amount of power would be required for speed. If the gear is not vertically movable and the rack moves up and down, then too great a distance is required and which would be unavailable in an aircraft. In view of the foregoing problems to alternate structures, the screw mechanism of the present invention is the best approach to the problem.

SUMMARY OF THE PRESENT INVENTION

A silent drive coat hanger rack mechanism is provided wherein a vertical rotating lead screw has a nut on the screw which moves vertically as the screw rotates. The nut carries a yoke bearing the coat rack vertically through elastic cushions permitting the nut to track the screw without transmitting the irregularities of motion to the yoke. The screw is made silent by the use of a nut of a Nylon or Teflon fiberglass mixed with a self-lubricating plastic such as moly-disulfide (one such product is called "TFL Composition"). The mountin of the screw and nuts is such that the side loads of the nut caused by the screw or guide are isolated from the yoke, the rack side load components are isolated from the screw, and self-aligning slippers of self-lubricating plastic, instead of rollers, are used to keep the guides clean, reduce noise and wear by having a low unit loading contact of the slipoer on the guide. A guide takes the load from the racks and yokes and keeps the load from the lead screw. Only vertical loads go through the nut.

In one embodiment the unit is designed to elevate 160 pounds of garments over 36 inches within 5 to 8 seconds without being heard by a passenger sitting 3 feet in front of it. The unit weighs 16 pounds and can be replaced, if faulty, in a few minutes with a screwdriver. In the event of power failure when in the stored position, a clutch release permits the rack to freefall under its own weight to make the garments accessible.

BRIEF DESCRIPTION OF THE DRAWINGS

FIG. 1 is a side elevational view of one form of coat hanger rack closet;

FIG. 2 is a vertical sectional view of the drive mechanism;

FIG. 3 is a plan view taken through the unit showing the coat rack attached thereto;

FIG. 3A is an enlarged view of the screw shown in FIG. 3;

FIG. 4 is a back elevational view of the yoke and slippers portion of the mechanism;

FIG. 5 is a view in partial section of one of the slippers; and

FIG. 6 is an edge partial sectional view taken through the slipper.

DETAILED DESCRIPTION OF THE DRAWINGS

Reference is now made to FIG. 1 wherein there is shown a passenger seat 10 of the type having a tiltable backrest 12 for the comfort of the occupant. This represents the last seat in the row so that the coat closet 14 also serves as a compartment divider. The coat closet 14 has luggage storage space 16 along the floor and an overhead coat compartment 18 adapted to store 48 coats overhead, in one configuration. At the rear of the coat compartment 18 is a drive assembly 20 which drives a lead screw 22. This screw rotates to effect the vertical movement of the coat rack 24. The coat rack 24 is moved to its lowermost position for the mounting of coat hangers 36 having garments 28 thereon. The lower portion 30 of the coat compartment 18 slants rearwardly to provide a space for seatback 12 to be tilted rearwardly as desired by the occupant. The top 32 of storage space 16 also slants rearwardly so as not to interfere with seatback 12 when tilted.

While the rack is in the down position, the garments 28 extend outwardly from the closet but when the coat rack is moved upwardly to its uppermost position shown by the dotted line 24A, they align themselves within the closet. When the coat rack 24 is again lowered, the rearward sloping portion 30 of the closet causes the garments to extend outwardly for ready accessibility.

During the time of travel in the vehicle of which this is a part, the coat rack must be moved vertically many times to accommodate the various passengers. Its proximity to the passenger make it necessary that the mechanism be silent in their operation, as well as fast, efficient and maiptanance free.

Referring now to FIG. 2 there is shown a guide 34 adapted for mounting within the closet. This guide consists of a rectangular in cross section tube with a vertical opening in the front wall 36 through which a yoke 38 may be positioned for the translation of the rotational motion of screw 22 into a vertical motion of a coat rack 24. Guide 34 is mounted to the front wall 40 of closet 14 by a lower bracket 42 and by brackets 44 through shock mountings 46 to other closet structure 48, as shown in FIG. 3 and FIG. 3A. Guide 34 is fastened to lower bracket 42 by a nesting pin 50 which passes through a bearing housing 52 and a lower resilient mounting pad 54 on guide 34, and into an aperture in the lower bracket 42. The lower end of screw 22 is rotatably mounted within a plastic bushing 56 which may be of a TFL Composition made by DuPont, for example. This bushing fits within a resilient lining 58 in bearing housing 52. Screw 22 is mounted at the upper end in roller bearings 66 mounted within the guide 34. Mounted on the end of the screw 22 is an elastic emergency stop 60 and mounted on the guide 34 just above this stop is a magnetic limit switch 62. Yoke 38 has a small permanent magnet (not shown) attached to it. When the yoke 38 passes the magnetic switch 62 in its downward movement, it interrupts electric current to the driving motor 64 and it stops. The resilient stop member 60 is for emergency purposes to ensure the stopping of the rack in the event the magnetic switch 62 does not inactivate the motor 64. A resilient emergency stop member 68 and an upper magnetic limit switch 70 limit the uppermost vertical position of the rack 24.

The screw shaft is connected through a clutch 72 to a driven pulley 74 which is powered by motor 64 through a driver pulley 76 and pulley belts 78. A clutch spring 80 maintains the screw 22 in this driving relationship. A clutch release 82, however, is provided for emergency use to release the clutch 72, to disengage the screw 22 from the rotational drive of motor 64. The pitch of the screw 22 and the weight of the garments on rack 24 are such that the rack 24 will be lowered by automatic freefall in the event of an electrical failure and upon manual release of the clutch. An appropriate cord or cable connection, not shown, may be attached to the clutch release 82 for operator use.

The rack 24 is raised and lowered by movement of nut 84 along screw 22 as it rotates. A self-lubricating plastic nut 84 is non-rotatably mounted on screw 22 and thus moves vertically upon rotation of the screw 22. This nut 84 is assembled in yoke 38 between metallic sleeves 86 which, in turn, bear against cushions 88 at each end. Yoke 38 is of a C-shaped configuration having a leg 90 terminating in an upper end 92 and a lower end 94 against which the resilient cushions 88 bear. These cushions are pre-loaded or compressed and absorb sudden changes in axial load without backlash. They also allow the nut 84 to track the imperfections of the screw 22 as the screw rotates, without loading the screw laterally and bending it. The lower sleeve 86 has a pair of tangs 96 which fit into appropriate recesses 98 on end 94 of the yoke 38. This prevents rotation of the nut 84 as screw 22 rotates, providing for the vertical movement of the nut 84 and hence the rack 24.

For fast, efficient operation, to reduce wear and noise, and also to permit the use of a smaller diameter screw 22, all lateral loads from the coat rack 24 are diverted from the screw 22. This is done by transmission of the lateral loads from the rack 24 through yoke 38, slippers 100 and onto guide 34. The ends 92 and 94 of yoke 38 pass around screw 22 but the openings therein are of sufficient diameter to provide clearance of the screw. As can be seen in FIG. 4, a pair of ears 102 and 104 extend outwardly from each of the yoke ends 92 and 94 for engagement with bearings 110, an upper pair and lower pair of slippers 100 which, in turn, engage the inner walls of guide 34. The bearings 110 permit the slippers 100 to follow such imperfections or twisting on the guide 34 without binding which otherwise might be caused by the weight of the garments on the coat rack 24 and hence the yoke 38. All four slippers are interchangeable, making production and maintenance more efficient.

As can be seen in FIGS. 5 and 6, the slippers 100 are made, preferably from aluminum castings, with inserts 106 of suitable anti-friction material on both edges. Springs 108 in cavities 112 preload the inserts 106 for outward movement against the walls of guide 34, shown in FIG. 2. In the center of the housing of the slipper 100 is a cavity into which a spherical or monoball bearing 110 is housed. Ears 102 and 104 from the ends 92 and 94 of the yoke 38 fit within these bearings. This permits a perfect alignment of all four slippers and the yoke in the rectangular guide 34.

Having thus described an illustrative embodiment of the present invention, it is to be understood that modifications thereof will become apparent to those skilled in the art and it is to be understood that these deviations are to be construed as part of the present invention.

We claim:

1. A silent drive coat hanger rack mechanism comprising:

a lead screw vertically positioned and rotatably mounted at its ends on a wall, means operatively related to said screw for rotating said screw, a nut non-rotatably mounted on said screw whereby rotation of said screw causes vertical movement of said nut, a yoke mounted on said screw over said nut for movement thereby, and a coat hanger rack connected to said yoke, said yoke including a leg terminating in upper and lower ends positioned over said nut and around said screw.

2. A silent drive coat hanger rack mechanism as in claim 1 including a guide, slippers slidably movable along said guide, said yoke being retained by said slippers for transmitting lateral loads from said rack to said guide, said guide having front and rear walls between which said slippers are positioned for vertical movement, said guide having side walls against which said slippers are urged.

3. A silent drive coat hanger rack mechanism as in claim 1 wherein said ends have openings through which said screw is positioned, said openings being sufficiently large to permit screw rotation therein without engagement therewith.

4. A silent drive coat hanger rack mechanism as in claim 1, said yoke ends having outwardly extending ears, a guide parallel to and spaced from said screw, slippers slidably movable along said guide, said slippers having recesses therein to receive said ears for transmitting lateral loads from said rack to said guide.

5. A silent drive coat hanger rack mechanism as in claim 1 wherein cushion mounts are positioned between said nut and said yoke ends whereby nut travel over irregularities in said screw is not transmitted to said yoke.

6. A silent drive coat hanger rack mechanism as in claim 1, and a non-rotatable engagement between said yoke and said nut to prevent rotation of said nut on said screw.

7. A silent drive coat hanger rack mechanism for, and in combination with, an overhead clothes closet wherein said closet has an elevated sloping portion for extending outwardly clothing of said rack for ready accessibility when said rack is in its downwardmost position, said mechanism comprising:

a lead screw vertically positioned and rotatably mounted at its ends on a wall, means operatively related to said screw for rotating said screw, a nut non-rotatably mounted on said screw whereby rotation of said screw causes vertical movement of said nut, a yoke mounted on said screw over said nut for movement thereby, and a coat hanger rack connected to said yoke.

8. A silent drive coat hanger rack mechanism as in claim 7 in combination with a tilt back seat in front of said closet whereby said back tilts under said sloping portion and clothes on said rack are moved vertically for storage over said seat.

* * * * *

PO-1050
(5/69)

UNITED STATES PATENT OFFICE
CERTIFICATE OF CORRECTION

Patent No. 3,738,497           Dated 12 June 1973

Inventor(s) Edward E. Betts, Stanley N. Kulczycki

It is certified that error appears in the above-identified patent and that said Letters Patent are hereby corrected as shown below:

In Column 2, line 19, the numeral "36" should be --26--.

Signed and sealed this 14th day of May 1974.

(SEAL)
Attest:

EDWARD M. FLETCHER, JR.
Attesting Officer

C. MARSHALL DANN
Commissioner of Patents